United States Patent [19]
Auclair

[11] Patent Number: 5,163,643
[45] Date of Patent: Nov. 17, 1992

[54] SPAN CLAMP ASSEMBLY

[75] Inventor: Randolph L. Auclair, New Hartford, Conn.

[73] Assignee: Electric Motion Company, Inc., Winsted, Conn.

[21] Appl. No.: 701,793

[22] Filed: May 17, 1991

[51] Int. Cl.⁵ .............................................. F16G 11/00
[52] U.S. Cl. .................................... 248/61; 248/74.4; 248/63
[58] Field of Search ............... 248/61, 74.4, 63, 231.6; 439/808; 24/115 R, 115 L, 115 N

[56] References Cited

U.S. PATENT DOCUMENTS

| | | | |
|---|---|---|---|
| 1,729,785 | 10/1929 | Lapp | 248/63 X |
| 3,141,643 | 7/1964 | Shrewsbury | 248/74.4 |
| 3,154,279 | 10/1964 | Fletcher et al. | 248/61 X |
| 3,160,378 | 12/1964 | Goewey | 248/61 |
| 3,177,542 | 4/1965 | James | 248/63 X |
| 4,014,504 | 3/1977 | Sachs | 24/135 R |
| 4,455,716 | 6/1984 | Leonardo | 24/135 N |
| 4,461,521 | 7/1984 | Sachs | 439/808 X |
| 4,526,428 | 7/1985 | Sachs | 248/61 X |

FOREIGN PATENT DOCUMENTS

| | | | |
|---|---|---|---|
| 1337580 | 8/1963 | France | 248/63 |
| 639963 | 5/1962 | Italy | 248/63 |

Primary Examiner—Karen J. Chotkowski
Attorney, Agent, or Firm—Chilton, Alix & Van Kirk

[57] ABSTRACT

A span clamp assembly is adapted for attachment to a support strand of a utility cable to provide an anchor structure for a service wire. The clamp assembly comprises a pair of cooperative jaws having alternating arrays of teeth which essentially interlock in a clamped engagement against the support strand. The teeth are shaped to penetrate in a limited fashion into the web between the strand and cable of a self-supporting utility cable.

12 Claims, 1 Drawing Sheet

SPAN CLAMP ASSEMBLY

BACKGROUND OF THE INVENTION

This invention relates generally to span clamps adapted for anchoring service wires to cables. More particularly, the present invention relates to span clamps which attach to cable messenger strand suspended between utility poles.

Cables employed for telephone and cable TV applications are typically strung between utility poles. Stranded steel cable, hereafter strand, functions as a support for the cable between the poles. The cable is commonly either lashed to the strand with wire or the cable and strand can be molded as an integrated structure during the manufacturing process to form a self-supporting cable commonly termed a "FIG. 8" cable. Service wires are typically strung from the cable to a structure from a selected location along the cable to provide the local service connection. A clamp is attached to the strand to provide an attachment point for the service wire so that it may be located anywhere along the cable.

The conventional clamp, which is employed as the anchor, typically has a pair of generally identical clamp members. The clamp members are contoured to engage opposing sides of the strand along an extended uniform smooth engagement surface which is typically one and one-half inches. A bolt having an upper looped head and a threaded lower shank is inserted through openings of the clamp members. The bolt is secured by a lock nut which locks the clamp members in clamped engagement to the strand. The service wire is typically passed through the upper looped part of the clamp to provide an attachment point for the service wire.

SUMMARY OF THE INVENTION

Briefly stated, the invention in a preferred form is a span clamp assembly for attachment to a cable messenger strand. The clamp assembly comprises a pair of cooperative jaws which engage the strand. One of the jaws has a rear engagement shoulder and a frontal strand receiving portion defining a generally concave-shaped, laterally extending groove for receiving a segment of the strand. In addition, the jaw includes a first array of laterally spaced teeth which are engageable against the strand. The first jaw also has an aperture. The second jaw includes a rear engagement shoulder, which engages against the rear engagement shoulder of the first jaw. A frontal strand receiving portion of the second jaw also defines a generally concave-shaped, laterally extending groove for receiving a strand segment, as well as a second array of laterally spaced teeth which are engageable against the strand. The grooves cooperate to receive generally diametrically opposed portions of the strand. The second jaw also has an aperture. A clamp securement member, which may comprise a bolt having a threaded shank, extends through the apertures to threadably receive a nut for clamping the jaw against the strand.

In preferred form, the teeth arrays of the jaws are arranged so that the teeth project in alternating fashion for interlocking against the strand. The teeth are contoured so that they do not penetrate the outer covering of the strand or shield of the cable. The extreme end teeth are smoothly contoured so that they do not bite into or penetrate the outer covering of the cable even when the strand and the cable are subjected to a torsional moment about the span clamp assembly due to winds or other environmental stresses.

An object of the invention is to provide a new and improved span clamp assembly for attachment to a messenger strand of a cable.

Another object of the invention is to provide a new and improved span clamp assembly having an enhanced clamping engagement to a messenger strand.

A further object of the invention is to provide a new and improved span clamp assembly which positively clamps in position by penetrating the web between the strand and the cable to enhance the positive engagement with the strand and the cable.

A yet further object of the invention is to provide a new and improved span clamp assembly which effectively prevents misalignment of the clamp and implements a positive clamping engagement with the strand during windy conditions and fluctuating temperatures.

Other objects and advantages of the invention will become apparent from the drawings and the specification.

DETAILED DESCRIPTION OF THE PREFERRED EMBODIMENT

Figure 1:
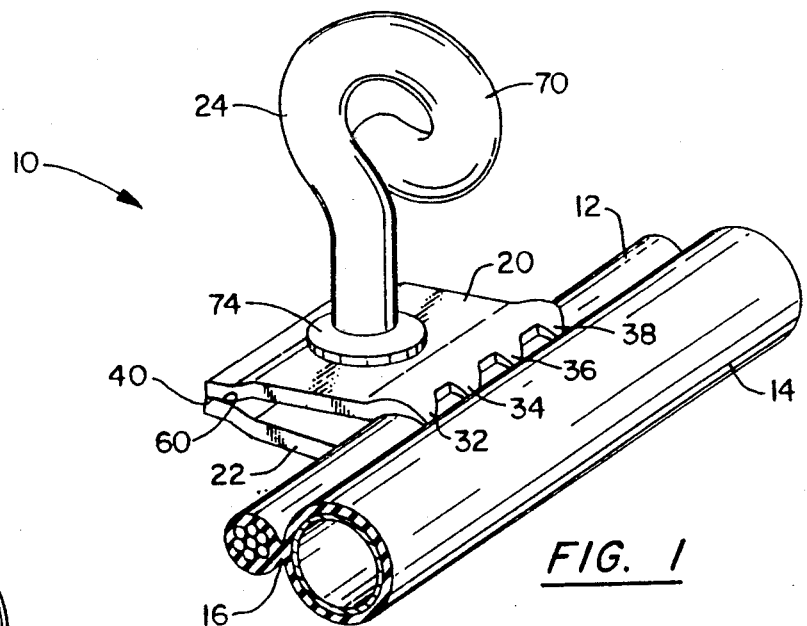
FIG. 1 is a perspective view of a strand and cable segment and a mounted span clamp assembly in accordance with the present invention.
Figure 2:
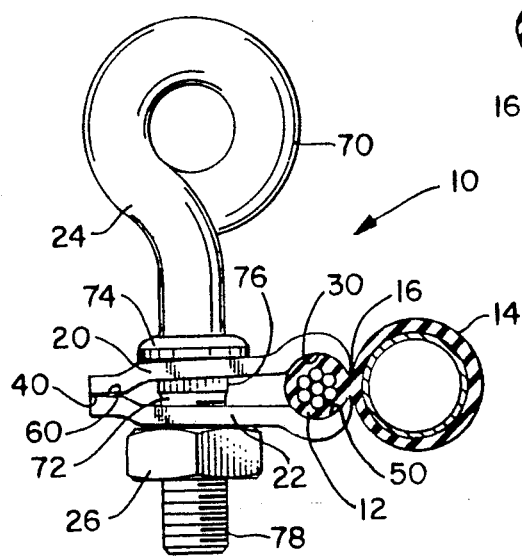
FIG. 2 is an end view of the strand, cable and mounted span clamp assembly of FIG. 1 viewed generally from the left thereof.
Figure 4:
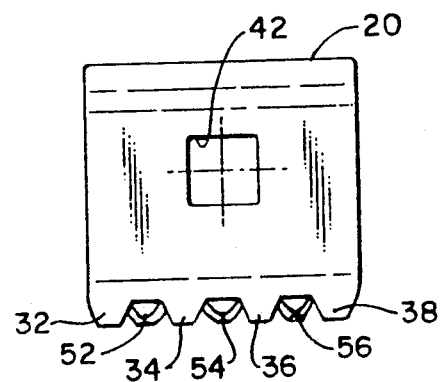
FIG. 4 is a top exploded view of the clamp members of FIG. 3.
Figure 3:
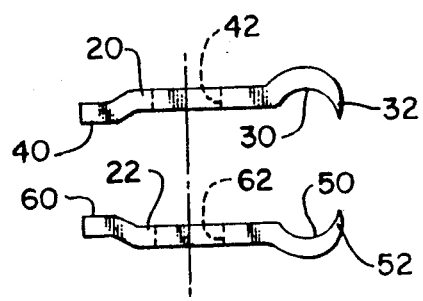
FIG. 3 is an end exploded view, partly in phantom, of a pair of clamp members for the span clamp assembly of FIG. 1.
Figure 5:
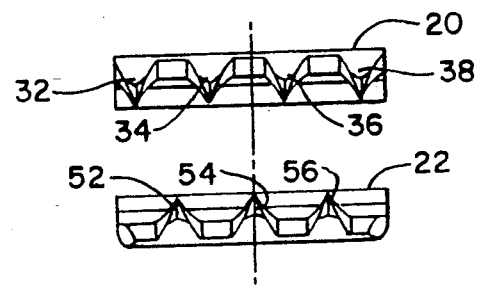
FIG. 5 is a front exploded view of the clamp members of FIG. 3.

With reference to the drawings wherein like numerals represent like parts throughout the figures, a span clamp assembly in accordance with the present invention is generally designated by the numeral 10. The span clamp assembly is adapted for mounting to a messenger strand 12 for a utility cable 14 such as may be employed for telephone or cable TV lines. The span clamp assembly 10 functions to provide an anchor point for a service wire (not illustrated) which connects with the cable and extends to a residence or structure to provide local service thereto. For the illustrated embodiment, a self-supporting cable (FIGS. 1 and 2) employs an integrated outer cover for both the messenger strand and the cable. The portions between the strand and the cable typically form a web 16. It should also be appreciated that the span clamp assembly has application in connection with a separate messenger strand which is lashed to the utility cable for supporting the cable between utility poles.

The span clamp assembly 10 comprises a pair of cooperative clamping jaws 20, 22 which are clamped together by an anchor bolt 24 and secured by a lock nut 26. The clamp assembly components may be dimensioned for various cable strands which typically have 6.6 mm, 10 mm or 16 mm diameters. Naturally, other dimensions are possible.

Jaw 20 is a plate-like member which is bent to form a frontal concave-shaped groove 30. The groove 30 laterally extends from one side of the jaw to the other. The groove is contoured and dimensioned for receiving and engaging a peripheral longitudinal segment of the strand 12. An array of teeth 32,34,36 and 38 partially define the groove and are accordingly contoured to conform to the outer surface of the support strand. The teeth are pointed so that they may slightly penetrate into the web 16 (as will be detailed further below).

The outside edges of the teeth are rounded, smoothed and tapered to a blunt point to prevent damage to the cable. The curves of the jaw are preferably formed in a punch press. The teeth are then shaved by a shaving procedure in the punch press. The body of the jaw and the teeth are supported by a fixture which has pockets. Punches having a half-moon type shape are displaced into the workpiece in the final shaping and shaving process. The teeth are dimensioned to provide a limited penetration into the web of a self-supporting cable and to prevent any overbite or damage to the conductors of the cable 14.

The jaw 20 is also affixed with a compound bend at the rear to form a substantially rectangular engagement shoulder 40. An aperture 42 is punched into a central portion of the jaw. The aperture 42 preferably has a square shape to prevent angular displacement of the anchor bolt as will be described below.

Jaw 22 comprises, at its frontal portion, a laterally extending groove 50 which extends from one side of the jaw to the other. Groove 50 is also generally concave-shaped and is also dimensioned for engaging the peripheral portions of the strand segment in surface-to-surface contact along an extended arcuate surface area. A second array of teeth 52,54, and 56 are also formed so as to partially define the groove. The teeth are dimensioned for limited penetration into the web 16. Teeth 52,54,56 are preferably formed by the method previously described.

The extreme end teeth 52,56 and 32,38 of each jaw are further shaped in a smooth surface contour to prevent the teeth from cutting into or damaging the cable when a rotational twist or torsional moment is applied to the clamp assembly such as may occur during windy conditions, fluctuating temperature changes, or other environmental happenings. It will be appreciated that the arrays of teeth 32,34,36,38 and teeth 52,54,56 are disposed in an alternating lateral arrangement so that the teeth essentially interlock against the received strand. The grooves 30,50 of each of the jaws essentially engage diametrically opposed arcuate portions of the strand 12 with the extremities of the teeth slightly penetrating into the web 16.

The jaw 22 also includes a compound bend which forms an engagement shoulder 60. Shoulder 60 is generally congruent to shoulder 40 and engages shoulder 40 in complementary fashion. Jaw 22 also includes a central aperture 62 which is preferably square in shape. In a clamped configuration, jaws 20 and 22 are positioned so that shoulders 40 and 60 engage, apertures 42 and 62 align, and grooves 30 and 50 align with the corresponding teeth arrays interlocking in alternating fashion.

The anchor bolt 24 includes a head which is bent to form an anchor loop 70 for the service wire. A shank 72 extends from the head. A circumferential clamp shoulder 74 transversely projects from the shank. The portion of the shank immediately adjacent the shoulder preferably has a substantially square section 76 which mates with the square apertures 42 and 62 to angularly fix the bolt when it is inserted through the apertures of the jaws. The distal portion of the shank has a threaded surface 78. The lock nut 26 is threaded to the threaded surface and tightened against jaw 22. Thus, opposing surfaces of the jaws 20 and 22 are respectively clamped between the shoulder 74 and the nut 26.

The foregoing span clamp assembly 10 functions to provide an anchor support for a service wire wherein the clamp may be positively attached to either a self-support cable strand or a separate support strand with enhanced clamping engagement. The clamp assembly is configured to prevent twisting and misalignment of the cooperative clamp jaws 20 and 22. The teeth function to provide an interlocking clamping engagement of high integrity. The teeth penetrate in a limited fashion into the web of a self-support cable. The teeth are dimensioned and shaped to prevent the teeth from penetrating into the conductors of the cable. In addition, the teeth at the extreme sides of the clamp assembly are further shaped to prevent engagement into the cable due to rotational forces acting on the clamp assembly resulting from windy conditions, temperature fluctuations or environmental forces. Naturally, the span clamp assembly 10 may be mounted in an efficient manner in the field.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A span clamp assembly for attachment to a cable support strand comprising:
   jaw means for engaging said strand comprising cooperative first and second jaws,
   said first jaw having a rear engagement shoulder and a frontal strand receiving portion defining a generally concave-shaped, laterally extending groove for receiving said strand and a first array of laterally spaced teeth engageable against said strand, each of said teeth being tapered to form a blunt terminus, said first jaw defining a first aperture;
   said second jaw having a rear engagement shoulder engageable with said first rear engagement shoulder and a frontal strand receiving portion defining a generally concave-shaped, laterally extending groove for receiving said strand and a second array of laterally spaced teeth engageable against said strand, each of said teeth being tapered to form a blunt terminus, said first array of teeth and said second array of teeth are arranged in laterally spaced alternating fashion wherein said first and second grooves receive generally diametrically opposed portions of said strand, said second jaw defining a second aperture; and
   clamp securement means for securing said jaw means in clamped engagement with said strand, said securement means comprising bolt means comprising a shank extendable through said first and second apertures and lock means mounted to said shank for clamping said jaws in cooperative fixed relationship.

2. The clamp assembly of claim 1 wherein said clamp securement means comprises an anchor bolt forming a loop, a shank and an abutment shoulder adjacent said shank, and said lock means comprises a lock nut threaded to said shank.

3. The clamp assembly of claim 1 wherein said first and second apertures have a generally square shape and said clamp securement means comprises a bolt having a square portion complementary with said apertures for angularly fixing the bolt in said apertures.

4. The clamp assembly of claim 1 wherein said first array comprises three teeth and said second array comprises four teeth.

5. A span clamp and cable support strand assembly comprising:

support strand means for supporting a cable;
   jaw means for engaging said strand comprising cooperative first and second jaws,
   said first jaw having a rear engagement shoulder and a frontal strand receiving portion defining a generally concave-shaped, laterally extending groove complementary with said strand means and receiving said strand means in a generally arcuate surface to surface relationship and a first array of laterally spaced tapered teeth having a blunt terminus and engageable against said strand means, said first jaw defining a first aperture;
   said second jaw having a rear engagement shoulder engaging with said first rear engagement shoulder and a frontal strand receiving portion defining a generally concave-shaped, laterally extending groove complementary with said strand means and receiving said strand means in a generally arcuate surface to surface relationship and a second array of laterally spaced tapered teeth having a blunt terminus and engageable against said strand means wherein said first array of teeth and said second array of teeth are arranged in laterally spaced alternating fashion and said first and second grooves receive generally diametrically opposed portions of said strand means, said second jaw defining a second aperture;
   clamp securement means for securing said jaw means in clamped engagement with said strand means, said securement means comprising bolt means comprising a shank extendable through said first and second apertures and lock means mounted to said shank for clamping said jaws in cooperative fixed relationship.

6. The clamp assembly of claim 5 wherein said clamp securement means comprises an anchor bolt forming a loop, a shank and an abutment shoulder adjacent said shank, and said lock means comprises a lock nut threaded to said shank.

7. The clamp assembly of claim 5 wherein said first and second apertures have a square shape and said clamp securement means comprises a bolt having a square portion complementary with said apertures for angularly fixing the bolt in said apertures.

8. The clamp assembly of claim 5 wherein said first array comprises three teeth and said second array comprises four teeth.

9. A span clamp assembly for attachment to a cable support strand comprising:

jaw means for engaging said strand comprising cooperative first and second jaws,
   said first jaw having a rear engagement shoulder and a frontal strand receiving portion defining a generally concave-shaped, laterally extending groove for receiving said strand and a first array of laterally spaced teeth having a blunt terminal portion and engageable against said strand, said first jaw defining a first aperture;
   said second jaw having a rear engagement shoulder engageable with said first rear engagement shoulder and a frontal strand receiving portion defining a generally concave-shaped, laterally extending groove for receiving said strand and a second array of laterally spaced teeth having a blunt terminal portion and engageable against said strand wherein said first and second grooves receive generally diametrically opposed portions of said strand and said teeth interlock in alternating fashion, said second jaw defining a second aperture;
   clamp securement means for securing said jaw means in clamped engagement with said strand comprising a bolt having a threaded shank extendable through said first and second apertures and a transverse shoulder and a lock nut mounted to said shank for clamping said jaws in cooperative fixed relationship wherein said jaws are clamped between said transverse shoulder and said nut.

10. The clamp assembly of claim 9 wherein said clamp securement means comprises an anchor bolt forming a loop.

11. The clamp assembly of claim 9 wherein said first and second apertures have a square shape and said clamp securement means comprises a bolt having a square portion complementary with said apertures for angularly fixing the bolt in said apertures.

12. The clamp assembly of claim 9 wherein said first array comprises three teeth and said second array comprises four teeth.

* * * * *